United States Patent

Clay

[15] 3,704,084
[45] Nov. 28, 1972

[54] ROTATIONAL MOLDING APPARATUS

[72] Inventor: Robert A. Clay, 1306 Logan Street, Costa Mesa, Calif. 92626

[22] Filed: Nov. 9, 1970

[21] Appl. No.: 87,933

[52] U.S. Cl. ................... 425/404, 425/429, 264/311
[51] Int. Cl. ........................ B29c 25/00, B29c 5/04
[58] Field of Search ..... 18/26 RR; 264/311; 425/404, 425/425, 429, 430, 433, 434

[56] References Cited

UNITED STATES PATENTS

| | | | |
|---|---|---|---|
| 3,350,745 | 11/1967 | Schott et al. | 18/26 RR |
| 2,811,747 | 11/1957 | Belz | 18/26 RR |
| 2,904,836 | 9/1959 | Jefferson et al. | 18/26 RR |
| 2,946,092 | 7/1960 | Yoder | 18/26 RR |
| 3,239,906 | 3/1966 | Ribot | 18/26 RR X |

FOREIGN PATENTS OR APPLICATIONS

| | | | |
|---|---|---|---|
| 39/15444 | 1964 | Japan | 18/26 RR |

Primary Examiner—Robert L. Spicer, Jr.
Attorney—Jessup & Beecher

[57] ABSTRACT

A rotational molding apparatus is provided in which a hollow spherical member is supported on rollers, and in which the rollers are controlled to cause the spherical member to turn on an infinite number of axes. One or more molding cavities are supported within the spherical member and which rotate therewith to carry out rotational molding operations.

8 Claims, 5 Drawing Figures

INVENTORS
Robert A. Clay
By Keith D. Beecher
ATTORNEYS

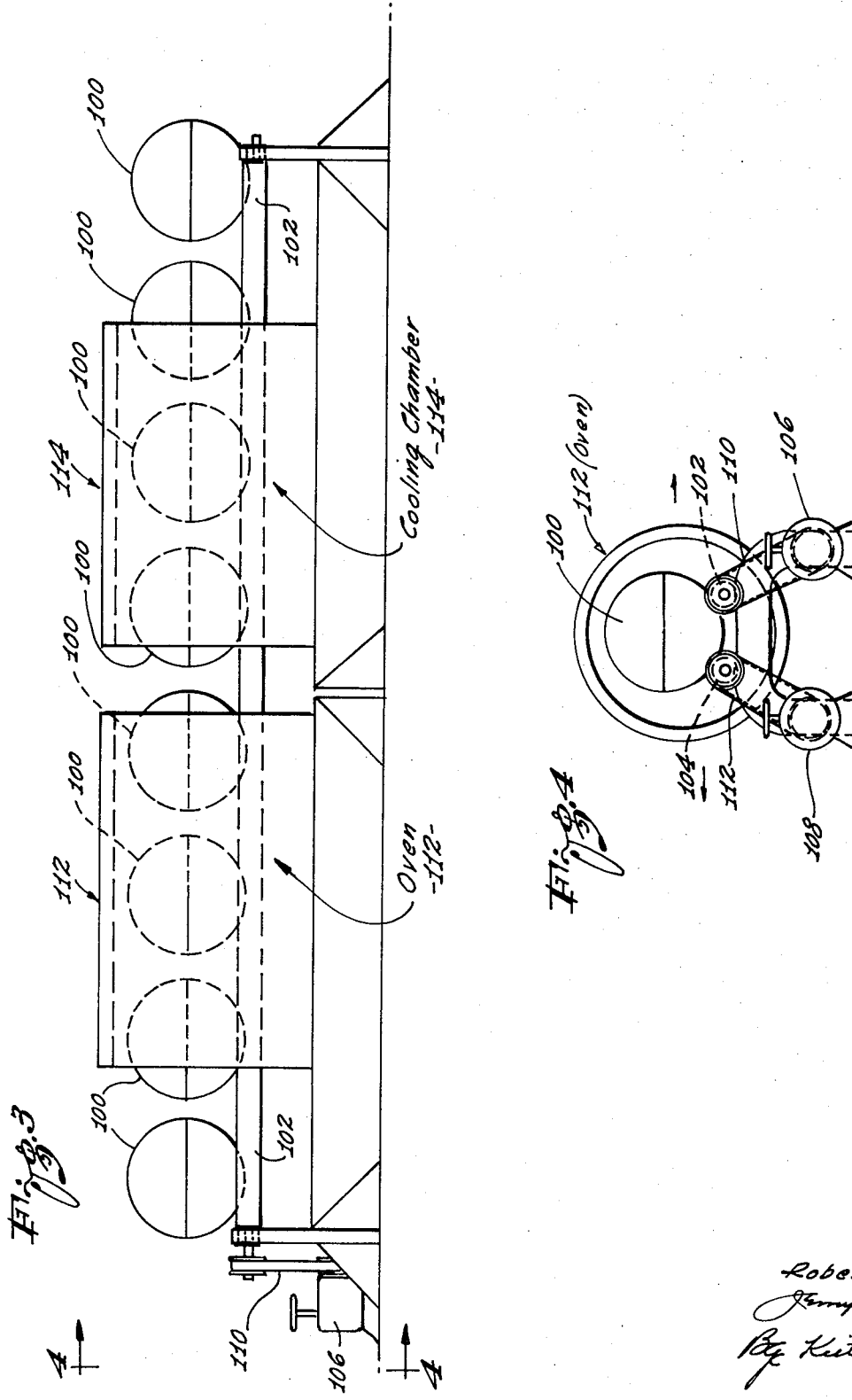

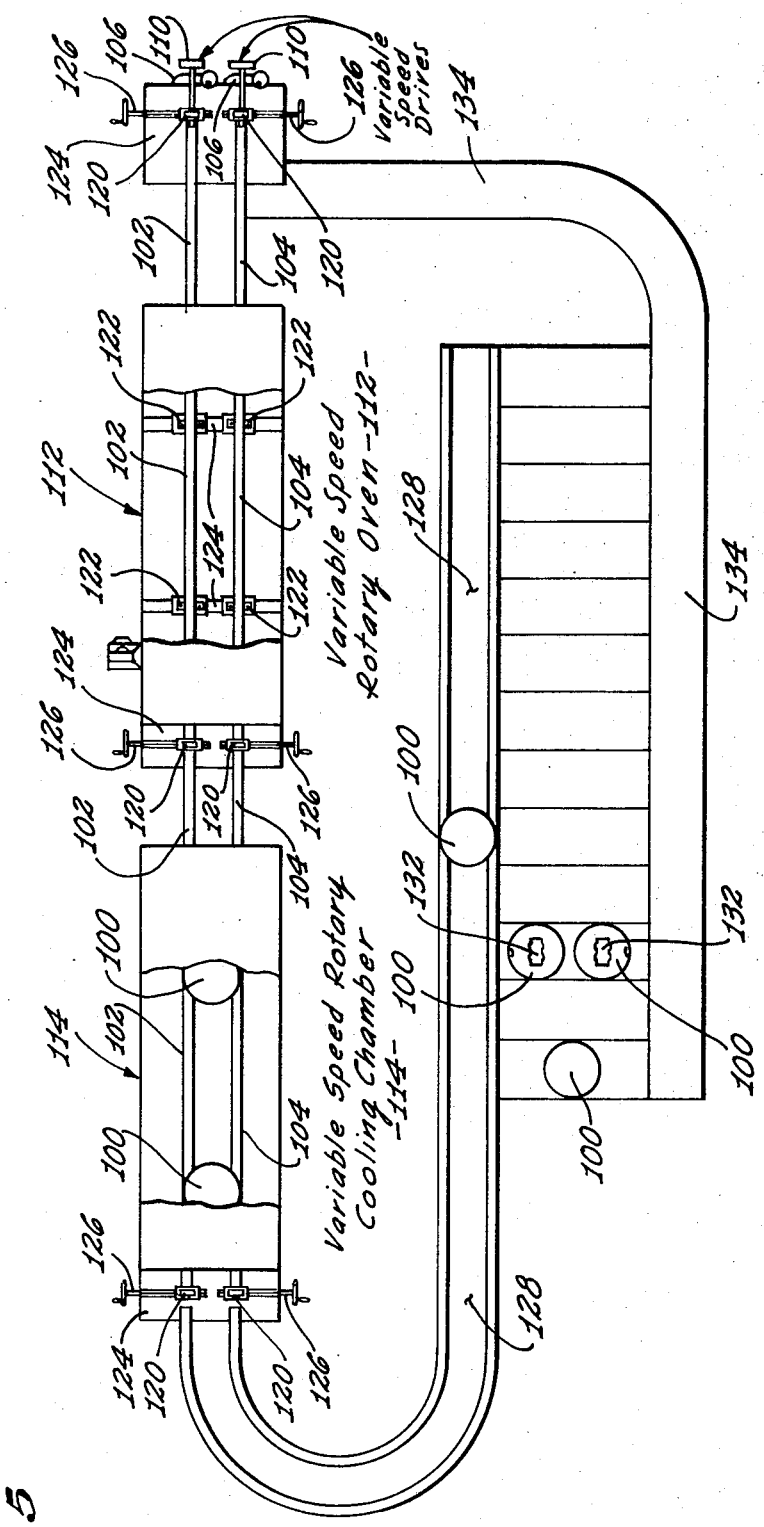

3,704,084

ROTATIONAL MOLDING APPARATUS

BACKGROUND OF THE INVENTION

Rotational molding apparatus is known in which a molding cavity is rotated at a low rotational speed. This speed is sufficiently low so that the molten molding material is disposed at the bottom of the cavity, and a layer of the molding material is deposited on the wall of the cavity as the mold turns.

If the mold is turned on one axis, however, a single annular layer of the molding material is deposited around the inner surface of the mold. This means that the mold surface is not completely covered with the molding material. Therefore, if the molding material is to form a uniform coating over the entire inner surface of the mold cavity, as is usually required, the mold must be rotated on more than one axis.

In one known type of prior art rotational molding apparatus, the mold is rotated about two axes disposed at right angles to one another. When this type of prior art apparatus is used, a number of orbital deposits of the molding material on the inner surface of the mold cavity are formed, and in most cases the spreading characteristics of the material and the changing direction of the gravitational effect, enables the molding material to establish a continuous coating on the wall of the mold cavity. However, such prior art apparatus, apart from being unduly complex and expensive, has tendency to create non-uniform wall thicknesses of the object formed thereby.

In the prior art two axis molding apparatus, the mold must be rotated about the axes at different rates, or only one orbital deposit will be formed on the wall of the cavity. If one axis is rotated faster than the other, the number of orbital deposits may be proportionally increased. Moreover, the greater the speed ratio between the two axes, the greater is the area of the cavity wall covered by the molding material. However, there are limits to the speeds at which molds for rotational molding may be rotated, otherwise centrifugal forces are encountered which displace the molten material at the bottom of the mold cavity.

Another prior art rotational molding apparatus is one in which the mold is rotated around a single horizontal axis, and is angularly moved in a reciprocal manner about a second axis which is orthogonally related to the horizontal axis. However, such a prior art molding apparatus also tends to produce an uneven coating of the molding material on the wall of the cavity, and especially at the parts of the cavity adjacent the rotational axis.

The rotational molding apparatus of the present invention as indicated above, includes one or more hollow spherical members supported on rollers, and which may be controlled so that each spherical member turned about an infinite number of axes. The result is that the mold cavity mounted within the individual spherical members may be rotated at a sufficiently low speed, as is desired for rotational casting, and yet it may be rotated in such a manner that the molding material is evenly distributed over the entire inner surface of the mold cavity.

Therefore, the major objectives of the present invention are to provide rotational molding apparatus which is relatively inexpensive to construct, which is relatively easy to operate, and which results in an even distribution of the molding material over the wall of the mold cavity so that molded objects of any desired uniform wall thickness may be formed in relatively short processing times. Another objective is to provide such a mold that lends itself to high production rotational molding operations.

BRIEF DESCRIPTION OF THE DRAWING

FIG. 3 is a side elevation of another embodiment in which a plurality of spherical members are directed through an oven and cooling chamber for a high production operation;

FIG. 4 is an end view of the apparatus of FIG. 3; and

FIG. 5 is a top plan view of the apparatus of FIG. 3.

DETAILED DESCRIPTION OF THE ILLUSTRATED EMBODIMENT

Figure 1:
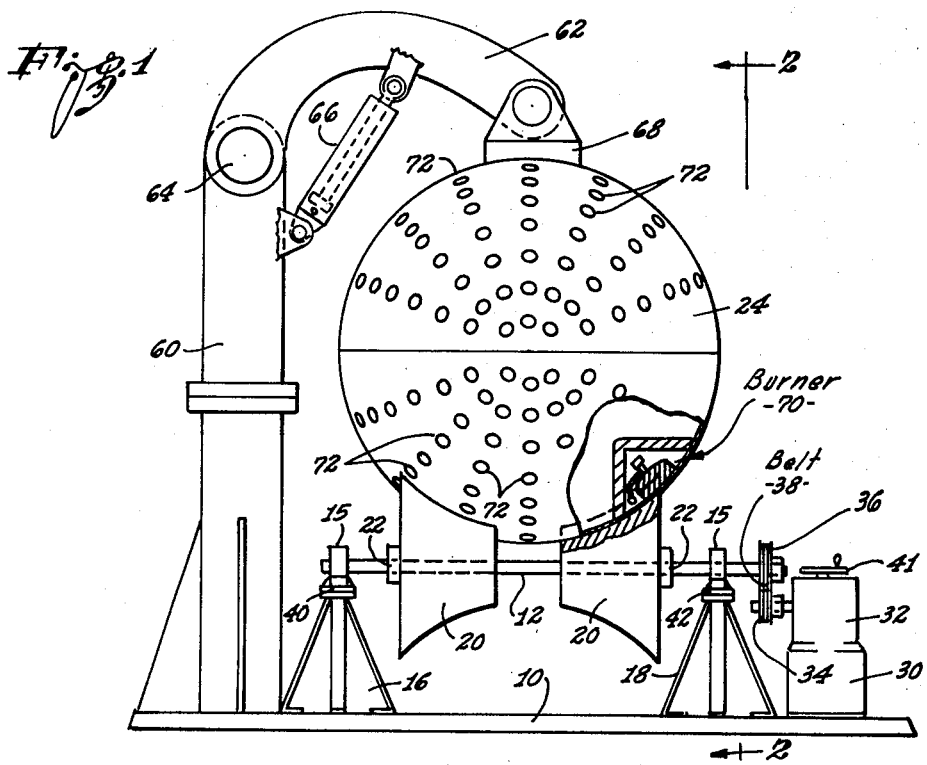
FIG. 1 is an elevational view, partly in section, showing molding apparatus constructed in accordance with one embodiment of the invention.

The molding apparatus shown in the drawing includes, for example, a base 10. A pair of shafts 12 and 14 are rotatably supported in appropriate bearings 15 which, in turn, are mounted on suitable brackets 16 and 18. Frusto-conical shaped rollers 20 are keyed to the shafts 12 and 14 by any appropriate means, such as by set screws 22. A hollow spherical shaped member 24 is supported on the frusto-conical rollers 20, as shown. The shafts 22 are driven by appropriate drive means such as an electric motor 30, a reduction gearing 32, and an appropriate transmission system, including pulleys 34 and 36 and a belt 38.

The elements 30–36 are used, for example, to drive the shaft 12 at a speed, and in a direction determined, by an appropriate manually operated control 40. it is to be understood that a similar drive means may be provided for the shaft 14, so that independent controls may be exerted on the shafts 12 and 14, which control the rate and direction of rotation of the respective shafts, and of the rollers 20 mounted thereon.

The bearings 15 may be supported on appropriate slide members 40 and 42 which, in turn, are supported on the respective brackets 16 and 18. The slide members 40 and 42 may be under control of appropriate hydraulic actuators, such as the hydraulic actuator 44 in FIG. 2. The hydraulic actuators may be independently controlled, so as to cock the shafts 12 and 14 to cause the respective rollers to assume any desired inclination within the horizontal plane. As the inclination of the rollers is changed, so is the axis around which the spherical member 24 is rotated. Therefore, by controlling the inclination of the rollers, the spherical member 24 may be made to actuate about any one of an infinite number of axis. Also, as mentioned above, the direction and speed of rotation of the spherical member may be controlled by manual or automatic manipulation of appropriate controls, such as the control 40.

Therefore, a simple and inexpensive rotational molding apparatus is provided, in which the desired rotation of one or more mold cavities mounted within the spherical member 24 may be easily and simply controlled, so that the mold cavities are rotated at selected speeds about an infinite number of axes. In this way, the mold material within the individual cavity is caused to flow over the entire inner wall of each cavity so as to provide a molded object of uniform wall thickness.

The spherical member 24 may be provided in two halves which may be secured to one another during the molding operation by any appropriate fastener means. The two halves of the spherical member 24 may be separated from one another to introduce the molding material, and to remove the molded objects, by means of a mechanism illustrated in FIG. 1. The illustrated mechanism includes an upright post 60, and an overhanging arm 62 pivoted to the upper end of the post 60 means, for example, of a shaft 64. A hydraulic motor 66, or other appropriate means, is coupled to the arm 62 and to the post 60 to turn the arm 62 about the axis of rotation of the shaft 64. A suitably controlled electromagnet 68 is mounted on the end of the arm 62.

In order to remove the upper half of the spherical member 24, the magnet 68 is energized, and the hydraulic motor 66 activated to turn the arm 62 in a counterclockwise direction. The attraction of the magnet 68 to the sphere 24 causes the upper half of the sphere to be lifted clear of the lower half, so that the molding cavities may be exposed for loading and unloading purposes.

An appropriate burner assembly 70 may be provided directly in the sphere 24, and the assembly may include its own source of fuel, such as gas, together with an appropriate timer. The burner assembly 70 when ignited, provides the desired heat for the mold cavities. The spherical member may incorporate a multiplicity of vent holes 72 which permit the products of combustion from the burner 70 to escape.

Figure 2:
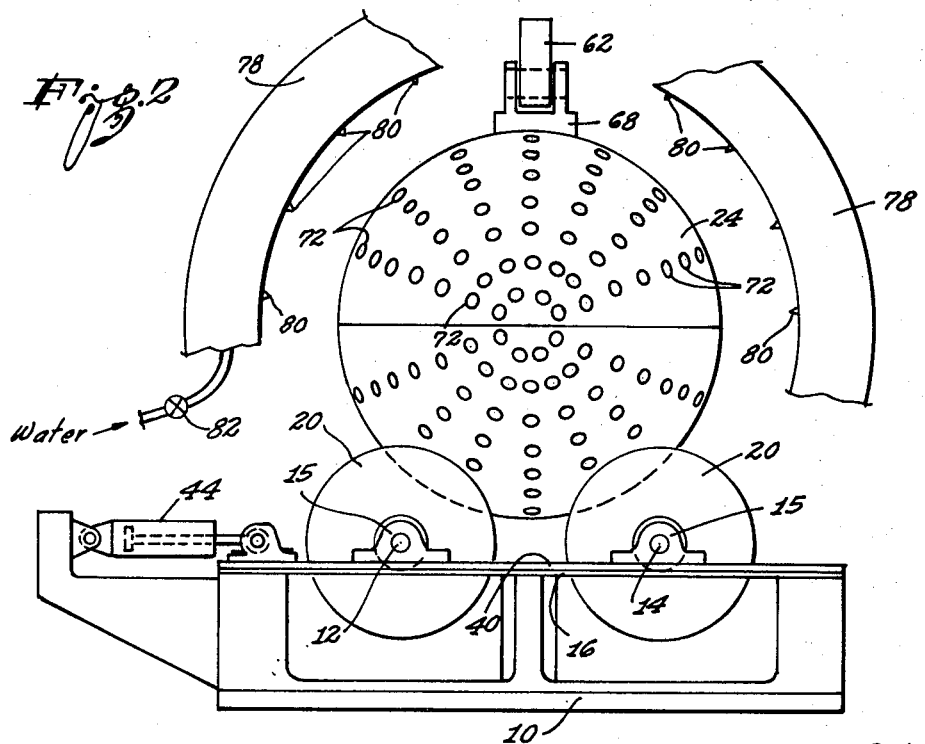
FIG. 2 is an elevational view like FIG. 1, but with the apparatus rotated 90° about a vertical axis.

The actual molding dies, which form the mold cavities, may be supported in any appropriate means within the sphere 24. In addition, a hood 78 may be provided around the apparatus, as shown in FIG. 2, and which mounts a plurality of nozzles 80. Then, at the end of the molding operation, cooling water sprays may be directed over the sphere 24 and into the vent holes 72 from the nozzles 80 so as to cool the mold dies within the sphere. The water sprays are initiated, for example, by turning on a valve 82.

The apparatus shown in FIGS. 3, 4 and 5, as mentioned above, constitutes a high production rotational molding apparatus in which a plurality of spheres 100 are used, each of which may be similar to the sphere 24 described above. The spheres 100 are supported on a pair of spaced shafts 102 and 104 which are individually driven at controllable speeds by drive motors 106 and 108 through appropriate belt drives 110 and 111, or their equivalent. The shafts, moreover, may be moved laterally towards and away from one another to change the axis of rotation of the spheres supported thereon. The transverse motion of the shafts may be achieved, as shown in FIG. 5, by supporting the shafts in bearings 120 and on rollers 122, which may be moved laterally across supporting bases 124. The lateral adjustments of the shafts may be made by adjustable screw mechanisms 126.

As the shafts 102 and 104 are driven at different speeds, the various spheres 100 are caused to turn about a multiplicity of axes, and are also caused to move, for example, from the left to the right in FIG. 3, and from right to left in FIG. 5. As the spheres are so moved, they first pass through an ovel 112 where they are raised to the required molding temperature, and they are subsequently moved through a cooling chamber 114 where water sprays or other means are used to cool the molds, as in the previous embodiment.

As the spheres 100 are discharged from the chamber 114, and as shown in FIG. 5, a gravity feed track 128 carries the spheres to a removal and recharging area. The spheres are opened at the area and the molded products removed from the internal molding dies 132. The molding dies are then again charged with molding material and the spheres are closed and transported to the entrance of the oven 122 by a track 134.

The result of the use of the apparatus of FIGS. 3–5 is that high production rotational molding may be achieved. As the spheres 100, for example, pass from the cooling chamber 114, they move to the removal and recharging area where the resulting molded products are removed. Then, the molding material is again inserted into the mold cavities in the individual spheres, as mentioned, and the spheres are returned by the track 134 back to the entrance of the oven 112 to be passed through the oven 112 and through cooling chamber 114.

The invention provides, therefore, an improved rotational molding apparatus which is constructed in order that a hollow spherical ball is supported on rotatable members, such as rollers or shafts, so as to be easily controllable for rotation about an infinite number of axes. Heating within the sphere for molding purposes may be provided, as described, by means of an internal burner. Alternatively, and as also described, the sphere may be moved through a heating oven. As a further alternative, for example, the sphere may be placed in a bath of hot oil and rotated for heating purposes.

The rotation of the sphere about the infinite number of axes, as described, provides for a uniform distribution of the molding material over the inner wall of the mold cavity supported within the sphere. As also described, the use of the hollow spheres of the present invention, supported on appropriate shafts is advantageous in that it enables heavier and larger molds to be used as compared with the prior art apparatus in which the molds are suspended on the ends of rotating arms. Also, it enables the spheres to be used for high production rotational molding operations, by means of a plurality of such spheres transported continuously through an oven and cooling chamber, such as described herein.

It is apparent, therefore, that although particular embodiments of the invention have been shown and described, modifications may be made. It is intended to cover such modifications in the following claims.

I claim:

1. Rotational molding apparatus comprising: a base; roller means comprising first and second shafts rotatably supported on said base in spaced parallel relationship for rotation about respective horizontal axes, and a plurality of conicalshaped members supported on said shafts; and a hollow spherical member freely supported on said roller means for rotation thereby about an infinite number of axes.

2. The rotational molding apparatus defined in claim 1, and which includes drive means coupled to said shafts for rotating said shafts and said conical-shaped members thereon at individually controllable speeds.

3. The rotational molding apparatus defined in claim 1, and which includes a burner assembly mounted in said hollow spherical member.

4. The rotational molding apparatus defined in claim 3, in which said hollow spherical member has a multiplicity of vent holes formed therein.

5. The rotational molding apparatus defined in claim 1, and which includes a hood surrounding said hollow spherical member, and a plurality of nozzles mounted on said hood for directing coolant sprays onto said hollow spherical member.

6. The rotational molding apparatus defined in claim 1, in which said roller means comprises first and second shafts rotatably supported on said base in spaced and parallel relationship for rotation about respective horizontal axes; oven means surrounding said shafts along a particular length thereof, said shafts causing said spherical member to move through said oven means as it is rotated by said shafts.

7. The rotational molding apparatus defined in claim 6, and which also includes a cooling chamber surrounding said shafts along a particular length thereof, and in which said shafts cause said spherical member subsequently to move through said cooling chamber after passing through said oven means.

8. The rotational molding apparatus defined in claim 6, and which includes driven means coupled to said shafts for rotating said shafts at individually controllable speeds.

* * * * *